(12) United States Patent (10) Patent No.: US 7,809,766 B2
Strahl et al. (45) Date of Patent: *Oct. 5, 2010

(54) WRITABLE SHARED DATABASE OBJECTS

(75) Inventors: Torsten Strahl, Kleinmachnow (DE);
Henrik Hampelmann, Havelberg (DE);
Uwe H. O. Hahn, Berlin (DE); Martin Kittel, Berlin (DE)

(73) Assignee: SAP AG, Walldorf (DE)

( * ) Notice: Subject to any disclaimer, the term of this patent is extended or adjusted under 35 U.S.C. 154(b) by 342 days.

This patent is subject to a terminal disclaimer.

(21) Appl. No.: 11/862,352

(22) Filed: Sep. 27, 2007

(65) Prior Publication Data

US 2009/0089307 A1 Apr. 2, 2009

(51) Int. Cl.
*G06F 7/00* (2006.01)
*G06F 17/30* (2006.01)
(52) U.S. Cl. ..................................... 707/802
(58) Field of Classification Search ............... None
See application file for complete search history.

(56) References Cited

U.S. PATENT DOCUMENTS 6,353,837 B1 * 3/2002 Blumenau .................. 707/205
6,973,455 B1 * 12/2005 Vahalia et al. ................. 707/8

\* cited by examiner

*Primary Examiner*—Uyen T. Le
(74) *Attorney, Agent, or Firm*—Buckley, Maschoff & Talwalkar LLC (57) ABSTRACT

A system may include a provider database, a reader database, and a database management system. The provider database may include a provider data area having a plurality of provider block addresses, and the reader database may include a reader data area having a plurality of reader block addresses, and a mapping of provider-specific identifiers to block addresses of the plurality of provider data pages and of reader-specific identifiers to block addresses of the plurality of reader data pages. The database management system may modify a database object of the reader database, the object being is associated with a provider-specific identifier; and modify the mapping to map the provider-specific identifier to a first block address of one of the plurality of reader data pages.

21 Claims, 9 Drawing Sheets

| File ID | Page No. |
|---|---|
| 0:dj89wejh | 0:43 |
| 0:90utjf24 | 0:567 |
| 0:asd34511 | 0:15667 |
| 0:e12308uf | 0:4321 |
| 1:asd34511 | 1:2309 |
| 1:9rjf8fjf8 | 1:180 |
| 1:redi0003 | 1:10897 |
| 1:3edm89uh | 1:6111 |

FIG. 6

| File ID | Object Name | Columns | Data Types | Permissions | Indices |
|---|---|---|---|---|---|
| 0:asd34511 | ~~~~~ | ~~~~~ | ~~~~~ | ~~~~~ | ~~~~~ |
| 0:dj89wejh | ~~~~~ | ~~~~~ | ~~~~~ | ~~~~~ | ~~~~~ |
| 0:90utjf24 | ~~~~~ | ~~~~~ | ~~~~~ | ~~~~~ | ~~~~~ |
| 0:e12308uf | ~~~~~ | ~~~~~ | ~~~~~ | ~~~~~ | ~~~~~ |
| 1:9rjf8fjf8 | ~~~~~ | ~~~~~ | ~~~~~ | ~~~~~ | ~~~~~ |
| 1:3edm89uh | ~~~~~ | ~~~~~ | ~~~~~ | ~~~~~ | ~~~~~ |

WRITABLE SHARED DATABASE OBJECTS

FIELD

Some embodiments relate to modifying objects stored within a database system. In particular, some embodiments concern modifying database objects imported from a provider database.

BACKGROUND

A conventional database-driven system may include several computing environments, each consisting of one or more applications and a database instance storing data associated with the one or more applications. Such a system may, for example, provide online transaction processing for several different vendors. More specifically, each computing environment may store data specific to a particular vendor and may be responsible for processing online transactions on behalf of the vendor.

A system as described above typically stores a significant amount of identical data across each database instance. This identical data may comprise static data unrelated to any specific vendor, such as payment processing data, shipping data, etc. Duplicative storage of this data is inefficient, particularly if this duplication is not intended for backup or redundancy. Moreover, the entire portion of static data must be recreated each time an additional environment is required (e.g., to support an additional vendor).

Commonly-owned U.S. patent application Ser. No. 11/715,777, entitled "Sharing of Database Objects", describes a system in which one or more "reader" databases may efficiently import and read shared database objects stored in a common "provider" database. Such a system may reduce a need to duplicate the shared database objects within the reader databases.

It may be desirable to provide write access to a shared database object imported by a reader database. Preferably, the write access is transparent to the applications of the reader database (i.e., the applications need not be aware that the database object was shared by and imported from the provider database), and should not affect the original shared database object of the provider database or other instances of the database object within other reader databases.

DETAILED DESCRIPTION

Figure 1:
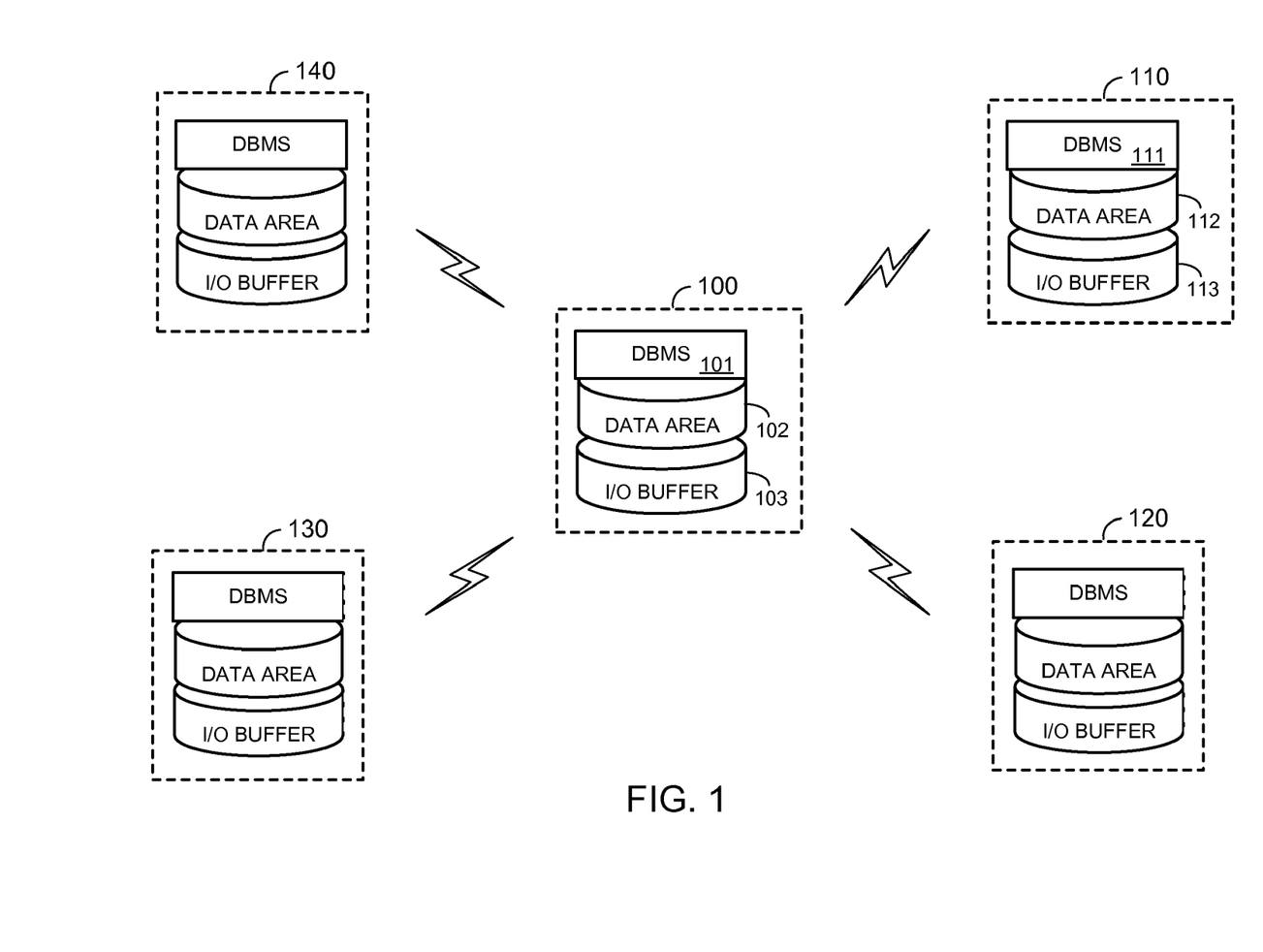
FIG. 1 is a block diagram of a general software architecture according to some embodiments.

FIG. 1 is a block diagram of a software architecture according to some embodiments. The architecture includes provider database instance 100 and reader database instances 110, 120, 130 and 140. In some embodiments, reader database instances 110, 120, 130 and 140 are capable of accessing data of provider database instance 100 directly. The data may, according to some embodiments, be accessed while database management system 101 of provider database instance 100 is not executing.

A database instance, generally, includes at least one operating system process, a physical data storage unit and a block of main memory (e.g., Random Access Memory). These components are represented in the database instances of FIG. 1 by a database management system (DBMS), a data area and an I/O buffer, respectively. The present description will use the terms "database" and "database instance" interchangeably.

Each illustrated DBMS may comprise any system for managing a database instance that is or becomes known. Generally, a DBMS may receive requests for data (e.g., Structured Query Language (SQL) requests from a database application), may retrieve requested data from its local data area, and may return the requested data to the requestor. A DBMS may also perform start-up, logging, recovery, management, optimization, monitoring and other database-related tasks.

A data area may comprise one or more disparate physical systems for storing data. The data of a data area may include database objects and associated index entries (i.e., application data), as well as configuration files, system files, converter pages, database parameters, paths, user information and any other suitable information. The database objects may include tables, indexes, views, users and user groups. A data area may also store a database catalog including metadata associated with the database objects that are stored within the data area.

According to some embodiments, at least one of reader database instances 110, 120, 130 and 140 may access data area 102 of provider database instance 100. This access allows the at least one reader database instance to read the configuration files, file directory, converter pages and other elements of provider database instance 100 that may be required to read the database objects of provider database instance 100. Some embodiments providing such access will be described in detail below.

An I/O buffer cache stores various elements of the data area during execution of its associated database instance. These elements may include recently-accessed pages of application data, current converter pages, database catalog objects and/or a log queue.

Some embodiments may include more or fewer than the four pictured reader database instances. In some embodiments, a single reader database instance may be capable of accessing data of two or more provider database instances.

Any of the FIG. 1 database instances may communicate with one or more database applications (not shown) over one or more interfaces provided by its DBMS. The applications may provide business monitoring, inventory control, online shopping, and/or any other suitable functions. The applications may, in turn, support client applications that may be executed by client devices. Such a client application may simply comprise a Web browser to access and display reports generated by a database application.

Database instances 100, 110, 120, 130 and 140 may receive data from disparate hardware and software systems, some of which are not interoperational with one another. The systems may comprise a back-end data environment employed in a business or industrial context. The data may be pushed to the database instances and/or provided in response to queries received therefrom.

The FIG. 1 database instances may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Two or more of the database instances of FIG. 1 may be located remote from one another and may communicate with one another via a computer network and/or a dedicated connection. Moreover, each displayed element of FIG. 1 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Figure 2:
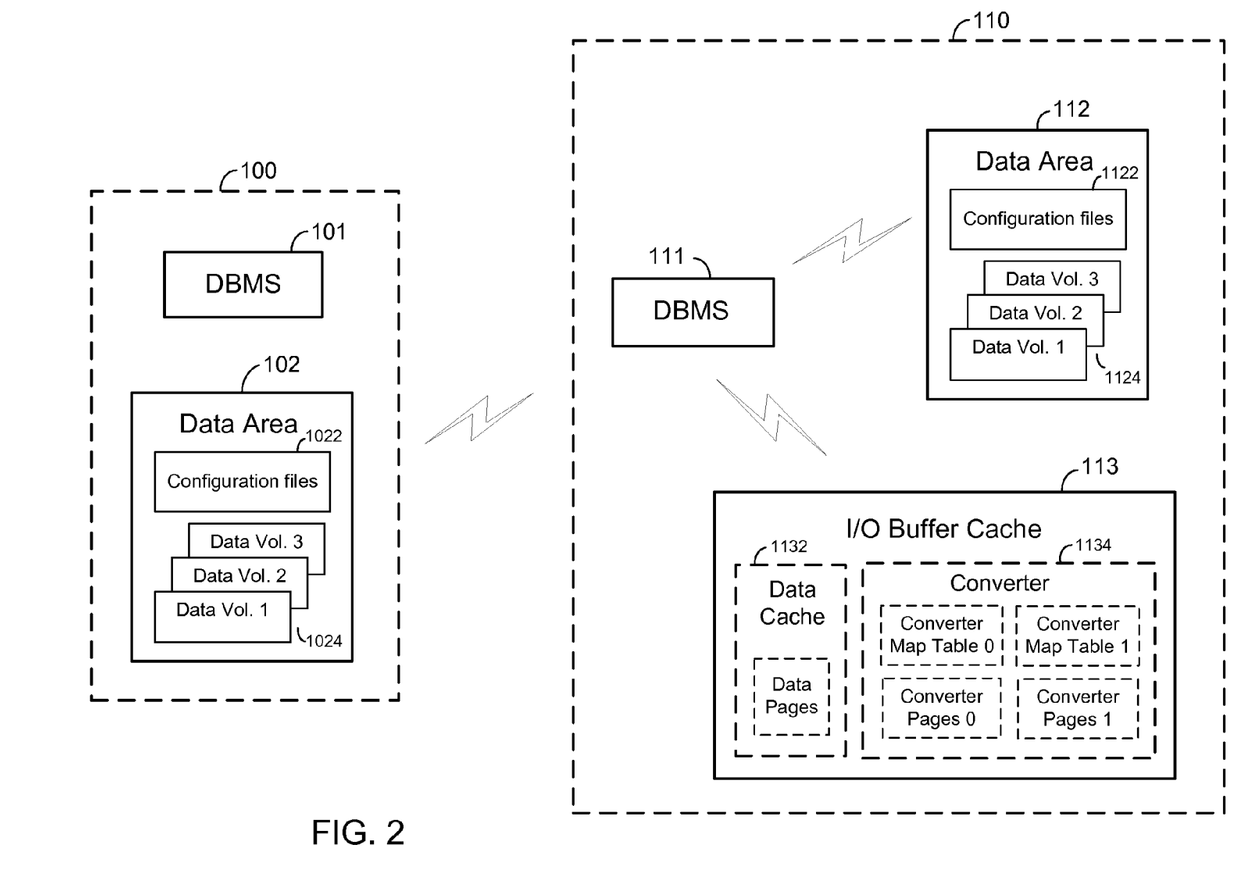
FIG. 2 is a detailed block diagram of a provider database instance and a reader database instance according to some embodiments.

FIG. 2 is a detailed block diagram of provider database instance 100 and reader database instance 110 according to some embodiments. I/O buffer cache 103 is omitted from FIG. 2 because the foregoing explanation presumes that DBMS 101 of provider database instance 100 is not executing.

Data area 102 includes configuration files 1022 and data volumes 1024. Configuration files 1022 store parameters for defining properties of database instance 100. These parameters may specify a size and physical location (i.e. path) of each data volume, and a maximum number of data volumes in data area 102.

As described above, data volumes 1024 may comprise not only database objects but also converter pages and a database catalog including metadata associated with tables, indexes, views, users and user groups that are stored within the data area. A data volume may comprise a portion of a physical hard disk, an entire physical hard disk, or a storage system composed of several physical hard disks.

Data volumes 1024 are subdivided into storage areas known as blocks. Also, the data stored in data volumes 1024 is stored in logical pages having the same size as a block. Accordingly, a page of data volumes 1024 may be accessed by referencing a data volume and a block address of the data volume.

Data area 102 may include more or fewer data volumes than illustrated in FIG. 2. Database instance 100 may also store log volumes in a log area (not shown). Such log volumes store information indicating changes made to stored data. The information may be used for returning database instance 100 to a consistent state after a system crash.

DBMS 111 and data area 112 of reader database instance 110 may be configured similarly to DBMS 101 and data area 102 of provider database instance 100. In some embodiments, DBMS 111 includes an SQL manager to process received SQL statements and a data access manager to manage access to stored data. Since reader database instance 110 will be executing in the forthcoming operational example, FIG. 2 also includes I/O buffer cache 113 of database instance 110.

I/O buffer cache 113 is used to manage memory that is available for I/O operations. I/O buffer cache 113 includes data cache 1132 and converter 1134. Generally, data cache 1132 stores pages from data area 112 that have been recently read or write-accessed. If a transaction changes a page, the changed page is initially saved in data cache 1132 while the previous version of the page remains in data area 112. At various intervals (e.g., if data cache 1132 reaches a threshold fullness or if a savepoint is scheduled), the changed data page is written to a location of one of data volumes 1124.

The aforementioned database catalog may map a name of each database object to a unique file identifier (ID). Data volumes 1124 may also include a file directory which maps file IDs to logical page numbers. The information of the database catalog and the file directory may therefore be used to determine a logical page number from a name of a database object. Once the page number is known, converter 1134 may be used to determine a block address at which the database object is stored.

In this regard, converter 1134 associates logical page numbers of data area 112 with physical block addresses of data volumes 1124. For a given page number, converter 1134 indicates a block address (e.g., a data volume number and an offset) at which an associated page is stored in data volumes 1124. In a case that DBMS 111 cannot find a page in data cache 1132, converter 1134 is accessed to determine a location of the page in data volumes 1124 based on the page's number.

Converter 1134 according to some embodiments includes converter map table 0, converter map table 1, converter pages 0 and converter pages 1. Converter map table 0 and converter pages 0 are used to determine block addresses for each logical page number associated with database 110, while converter map table 1 and converter pages 1 are used to determine block addresses for each logical page number associated with database 100. As will be described below, a database object having a logical page number associated with database 100 may be stored at a block address of database 110.

For example, converter map table 0 maps a logical page number associated with database 110 to a memory address of I/O buffer cache 113 at which a converter page associated with the page number is located. The associated converter page, in turn, indicates a data volume and a block address for the logical page number. Each of converter pages 0 also indicates a data volume and a block address at which the converter page is stored in data volumes 1124. One or more of converter pages 1 may be stored in data volumes 1024 and/or data volumes 1124 according to some embodiments, as will be described below.

Data cache 1132 and converter 1134 are illustrated separately in FIG. 2 for the sake of clarity. According to some embodiments, data cache 1132 and converter 1134 might not comprise separate, contiguous memory addresses of I/O buffer cache 113. For example, converter pages 0 may be interspersed among the data pages throughout I/O buffer cache 113.

Detailed examples of the foregoing elements according to some embodiments will be provided with respect to FIGS. 4A through 7. Usage of the elements to read a database object will also be described. Moreover, some embodiments will be described which provide efficient write access to a database object having an identifier associated with a provider database.

Figure 3:
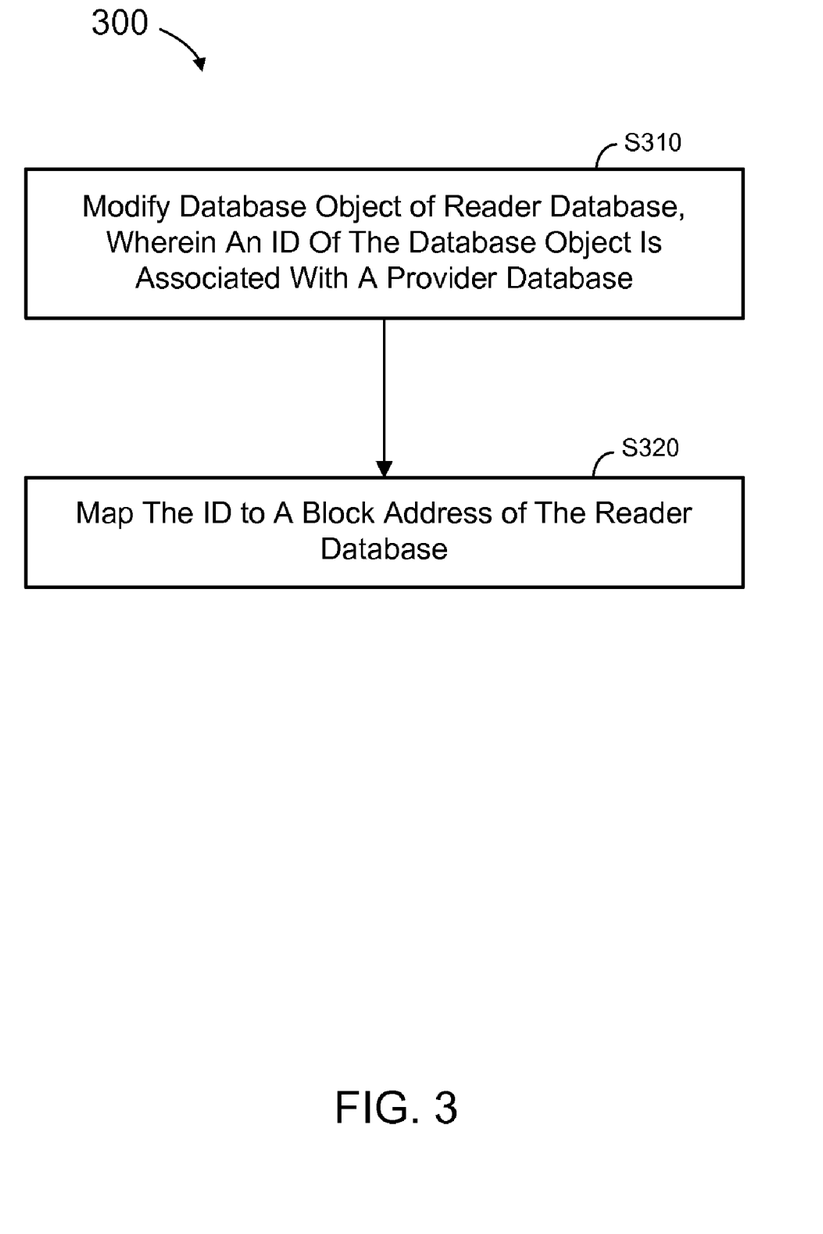
FIG. 3 comprises a flow diagram of a process according to some embodiments.

FIG. 3 is a flow diagram of process 300 according to some embodiments. Some embodiments of process 300 may provide a reader database instance with write access to database objects read from a provider database instance. In some embodiments, a hardware environment of database instance 110 executes program code of DBMS 111 to perform process 300. Process 300 may be performed in response to a command received from a database client (not shown), or may be initiated by a thread of DBMS 111.

Process 300 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A database object of a reader database is modified at S310. An identifier of the database object is associated with a provider database. The identifier may comprise a file ID, a page number, or any other identifier that may be associated with a database object. The identifier may be associated with the provider database (e.g., database 100) using any suitable convention, including but not limited to those described below.

According to some embodiments of S310, DBMS 111 locates a data page associated with the database object in data cache 1132. If the data page is not located in data cache 1132, DBMS 111 may use converter map table 1 and converter pages 1 to locate the data page within data volumes 1024 of provider database 100, and may subsequently read the database object into data cache 1132. As described above, DBMS 111 uses converter map table 1 and converter pages 1 because the identifier of the database object is associated with provider database 100. DBMS 111 then performs a write operation to modify the database object within data cache 1132.

Next, at S320, the identifier is mapped to a block address of the reader database. In some embodiments, this mapping comprises re-mapping the identifier from a block address of data volumes 1024 to a block address of data volumes 1124. The identifier may remain unchanged (i.e., associated with the provider database 100) according to some embodiments, but will thereafter refer to a block address of data volumes 1124 instead of a block address of data volumes 1024.

Some embodiments of the foregoing provide reader database 110 with efficient write and/or read access to the modified database object. Although the identifier of the database object continues to reference provider database 100, the modified database object will be stored in reader database 110 and may be accessed by standard mechanisms thereof. Moreover, in some embodiments, the modification will not be visible to other reader databases (e.g. 120, 130, 140) and will not affect their access to the original version of the database object stored in data volumes 1024 of provider database 100.

Figure 4A:
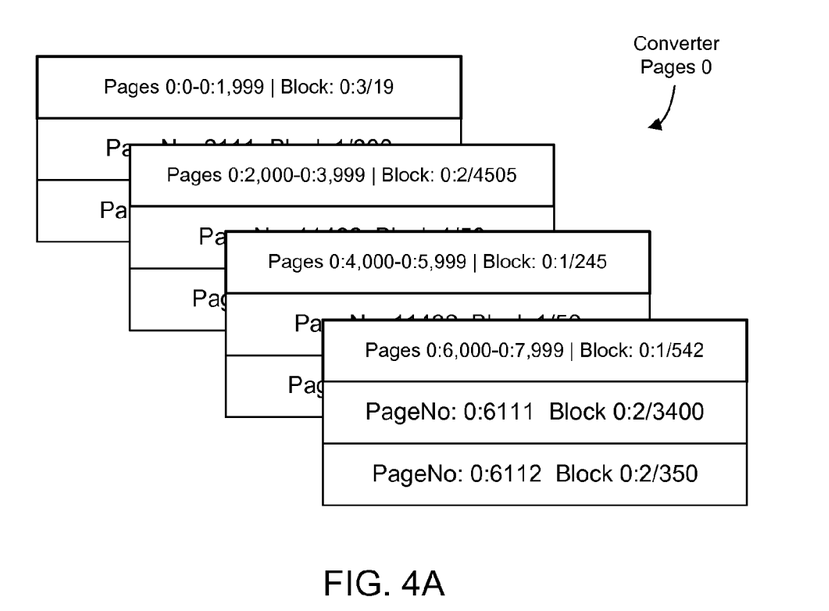
FIG. 4A illustrates portions of reader database instance converter pages including provider-specific page numbers and block addresses according to some embodiments.

FIGS. 4A through 7 provide particular examples of elements of the FIG. 2 embodiment. The examples may be used in conjunction with embodiments different from that illustrated in FIG. 2. In this regard, FIG. 4A illustrates portion of converter pages 0 according to some embodiments. Converter pages 0 may comprise many more pages and each page may include many more entries than illustrated.

Each of converter pages 0 provides a mapping of logical page numbers to respective block addresses of data area 112. As described above, each data object is associated with a file identifier, which in turn is associated with a logical page number. Accordingly, once the page number of a data object is known, converter pages 0 may be used to determine a block address at which the data object is stored.

The block addresses are represented as a volume number/offset, with the volume number referring to one of volumes 1124. Each converter page also specifies a block address at which it is stored within data volumes 1124. Each page number and block address of FIG. 4A is prefaced with an index "0:". The index associates the page numbers and block addresses with reader database 110. More specifically, the index indicates that the volume specified by each block address is a volume of data area 112, and not a volume of data area 102 or another data area. The index associated with a particular page number indicates whether to use converter map table 0 or converter map table 1 to locate the associated data object.

Figure 4B:
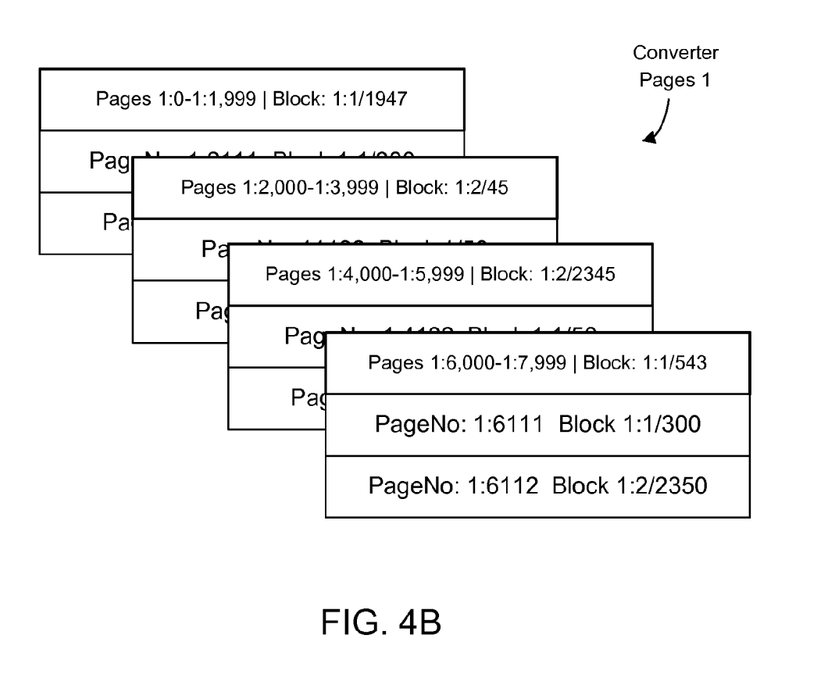
FIG. 4B illustrates portions of reader database instance converter pages including reader-specific page numbers and block addresses according to some embodiments.

Converter pages 1 of FIG. 4B associate logical page numbers with respective block addresses of data area 102. The index "1:" of each block address indicates that the specified volume is a volume of data area 102, and the index "1:" of each page number indicates that converter map table 1 should be used to locate the associated data object.

Generally, page numbers and block addresses beginning with "0:" may be referred to as reader-specific, while those beginning with "1:" may be referred to as provider-specific. As described in aforementioned U.S. patent application Ser. No. 11/715,777, the indicies may assist in preventing confusion between otherwise identically-numbered logical pages or data volumes of provider database 100 and reader database 110.

The indicies may be added to the page numbers and block addresses as described in application Ser. No. 11/715,777, the contents of which are incorporated by reference for all purposes. Embodiments are not limited to the methods described therein.

Figure 5:
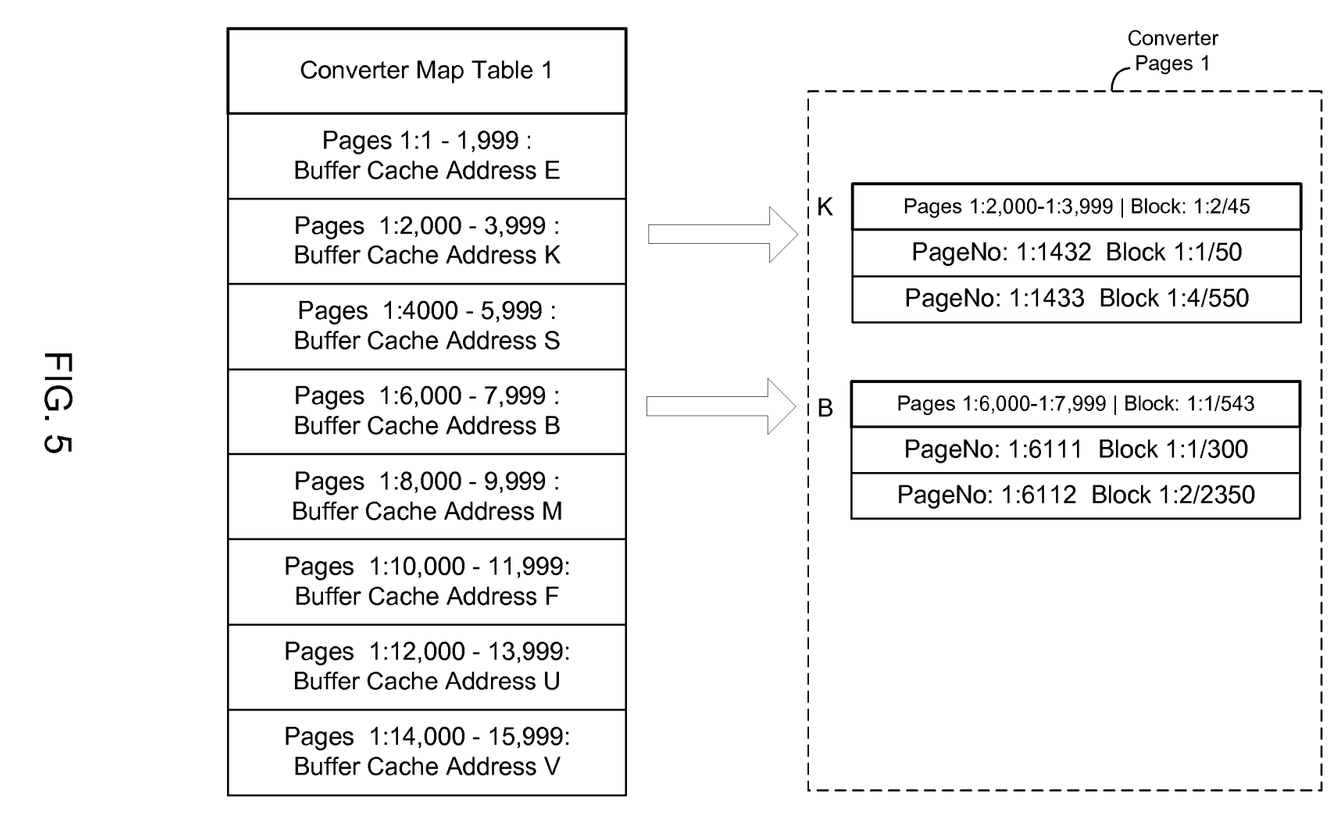
FIG. 5 illustrates components of a converter in a reader database cache according to some embodiments.

FIG. 5 illustrates tabular representations of converter map table 1 and converter pages 1 to provide background for the forthcoming description. As shown, converter map table 1 specifies several ranges of provider-specific logical page numbers. Converter map table 1 associates a memory address of I/O buffer cache 113 with each specified range. As also shown, stored at each memory address is one of converter pages 1 that lists page numbers in the range associated with each address.

Figure 6:
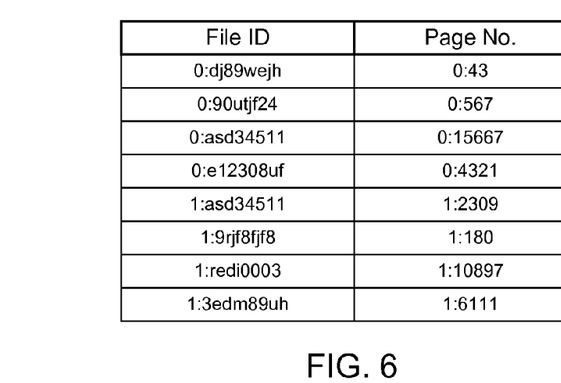
FIG. 6 illustrates a portion of a reader database file directory including reader-specific and provider-specific file identifiers and page numbers according to some embodiments.

FIG. 6 illustrates a mapping of file identifiers to logical page numbers. The mapping associates identifiers of provider database 100 with logical page numbers of provider database 100, and identifiers of reader database 110 with logical page numbers of reader database 110. As shown, provider database 100 and reader database 110 may use one or more identical file identifiers and page numbers.

The mapping may comprise a file directory of database instance 110. Data volumes 1124 of database instance 110 may include a system table FILES which provides, for each internal database object, a file identifier and a logical page number of the file root. The file identifiers and the page numbers prefaced with the index "1:" are associated with provider database 100. As will be described below, a database object associated with such file identifiers or page numbers may be stored at a block address of data volumes 1124 of reader database 110.

Figure 7:
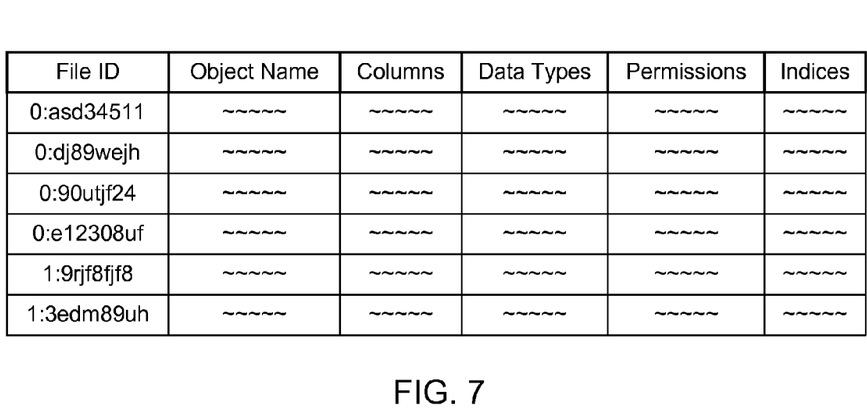
FIG. 7 illustrates a reader database catalog associating provider-specific and reader-specific file identifiers with metadata of database objects according to some embodiments.

FIG. 7 is a tabular representation of a portion of a database catalog of reader database 110 according to some embodiments. The database catalog associates each of the file identifiers of FIG. 6 with an object name and other metadata. The database catalog may be stored in data volumes 1124 and may include all or any subset of object metadata associated with the provider-specific file identifiers.

The logical page numbers, block addresses, file identifiers, database object names, and object metadata of provider database 100 may be indexed and incorporated into converter 1134, a file directory and a database catalog of database 110 as described in application Ser. No. 11/715,777, the contents of which are incorporated by reference for all purposes. The index "0:" may also be added to the logical page numbers, block addresses, and file identifiers of reader database 110 as described in application Ser. No. 11/715,777. Embodiments are not, however, limited to the methods described therein.

Figure 8:
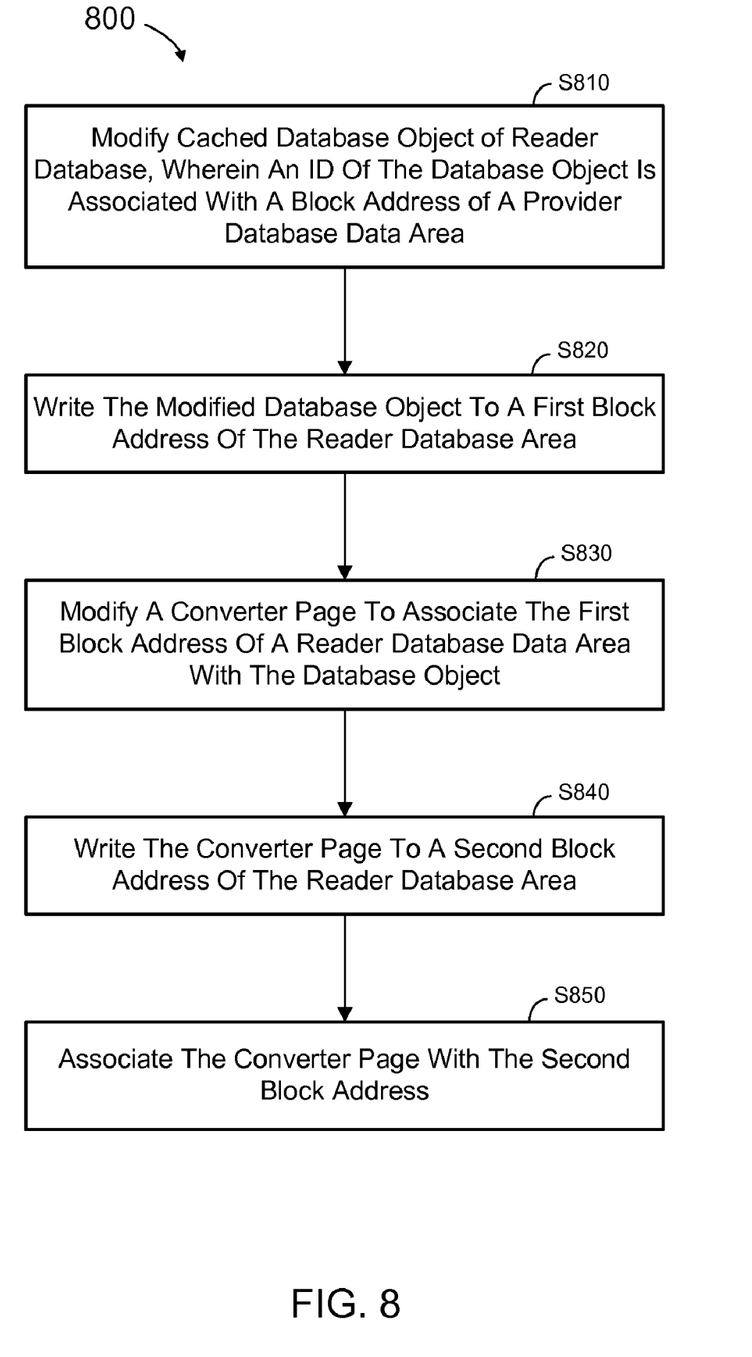
FIG. 8 comprises a flow diagram of a process according to some embodiments.

FIG. 8 comprises a flow diagram of process 800 according to some embodiments. Process 800 will be described with respect to the above-described elements of FIGS. 4A through 7, but embodiments are not limited thereto.

Prior to process 800, and as described in detail in application Ser. No. 11/715,777, DBMS 111 may read configuration files 1022 of data area 102. In order to facilitate reading of configuration files 1022, DBMS 111 is provided with a path to configuration files 1022. DBMS 111 is also provided with access to the physical storage unit which stores configuration files 1022. In some embodiments, configuration files 1022 are stored in an <independent_data_path>/config directory of the physical storage unit.

Configuration files 1022 include the names of each of data volumes 1024 as well as their respective data paths. DBMS 111 uses this information to read the converter pages of provider database 100 stored in data volumes 1024. The converter pages provide a mapping of logical page numbers of provider database 100 to block addresses within data volumes 1024. DBMS 111 generates converter map table 1 and converter pages 1 as shown in FIG. 4B based on the read converter pages of provider database 100. DBMS 111 may also generate converter map table 0 and converter pages 0 as shown in FIG. 4A.

Next, DBMS 111 reads a file directory of database instance 100 to acquire a mapping of provider-specific file identifiers to provider-specific page numbers. The provider-specific file identifiers and provider-specific page numbers may be indexed with "1:" and added to a file directory of reader database 110 as shown in FIG. 6. The reader-specific file identifiers and page numbers of the file directory may also be indexed with "0:" as shown.

DBMS may then use the file directory of database 110 to scan the database catalog of provider database 100 for shared database objects. In this regard, the database catalog of provider database 100 may flag one or more database objects as sharable. The shared database objects are then included in a local database catalog of reader database 110 as shown in FIG. 7.

Process 800 may commence in response to an instruction to modify a database object stored in a reader database cache. Although the database object is stored in the reader database, an identifier of the database object is associated with a block address of a provider database data area. The database object is modified at S810.

According to some embodiments of S810, DBMS 111 receives an instruction to modify a database object having a particular object name. DBMS 111 consults the database catalog of reader database 110 to determine a file identifier associated with the object name. Next, DBMS 111 accesses its file directory to determine a page number associated with the file identifier. Referring to the FIG. 6 example, the logical page number and the file identifier are prefaced with "1:".

DBMS 111 uses the logical page number to attempt to locate a data page associated with the database object in data cache 1132. If the data page is not located in data cache 1132, DBMS 111 uses converter map table 1 and converter pages 1 to locate the data page within data volumes 1024 of provider database 100, and subsequently reads the database object into data cache 1132. DBMS 111 uses converter map table 1 and converter pages 1 because the page number is prefaced by "1:" and is therefore associated with a block address of data are 102. DBMS 111 then performs a write operation to modify the database object within data cache 1132.

The modified database object is written to a block address of data area 112 at S820. In this regard, and in accordance with a "shadow memory" feature, DBMS 111 may write all modified pages in cache 113 to data area 112 once a number of modified pages reaches a threshold amount, or after passage of a designated time interval. The modified pages are not written to the block addresses of the data volumes from which they were read. Rather, each original unmodified page remains at its respective block address and the modified page is written to a new block address of data 112.

A converter page is modified at S830 to associate the database object with the block address to which the modified database object was written at S820. For example, DBMS 111 initially locates a converter page associated with the modified database object. As described above, converter map table 1 is consulted to determine a location of a converter page which is associated with the database object.

Figure 9:
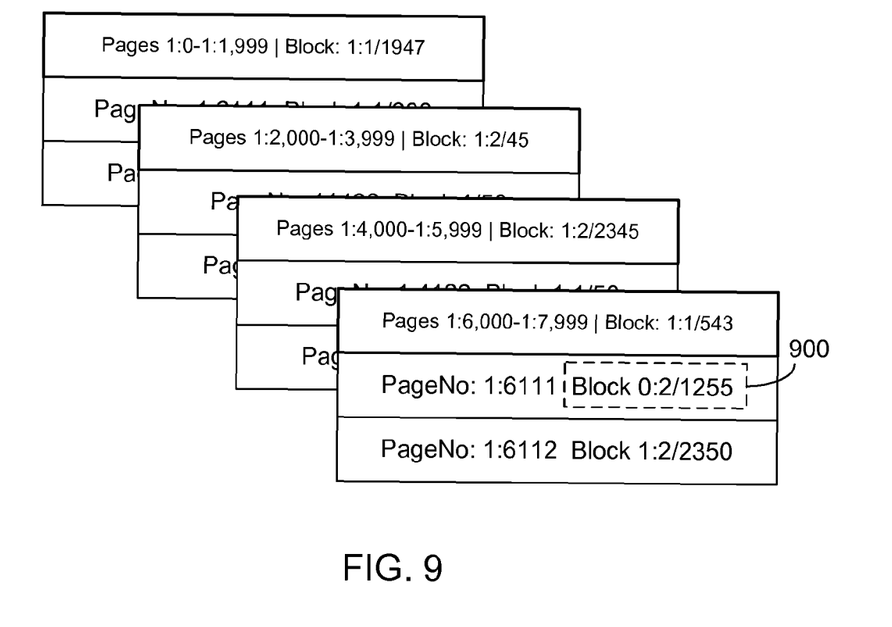
FIG. 9 illustrates portions of reader database instance converter pages according to some embodiments.

FIG. 9 illustrates converter page 900 which is associated with logical page numbers 1:6,000 through 1:7,999. It will be assumed that the logical page number associated with the modified database object is 1:6111. Accordingly, at S830, block address 910 is changed from the block address shown in FIG. 4B (i.e., 1:1/300) to a block address of reader database data area 110 (i.e., 0:2/1255) to which the modified database object was written. Neither the file identifier nor the logical page number of the database object is changed, and therefore both remain associated with provider database 100 (i.e., prefaced with "1:").

The modified converter page is written to a second block address of the reader database area at S840. Again, the modified converter page may be written to a block address of data area 112 once a number of modified pages in cache 113 reaches a threshold amount, or after passage of a designated time interval. For example, converter page 900 may be written to a block address of data volumes 1124 at S840.

Figure 10:
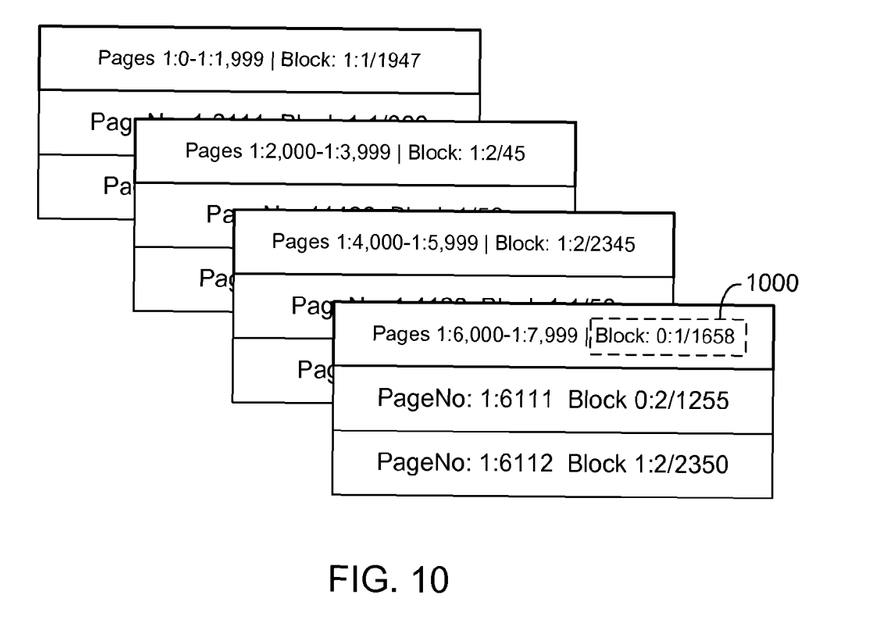
FIG. 10 illustrates portions of reader database instance converter pages according to some embodiments.
Figure 11:
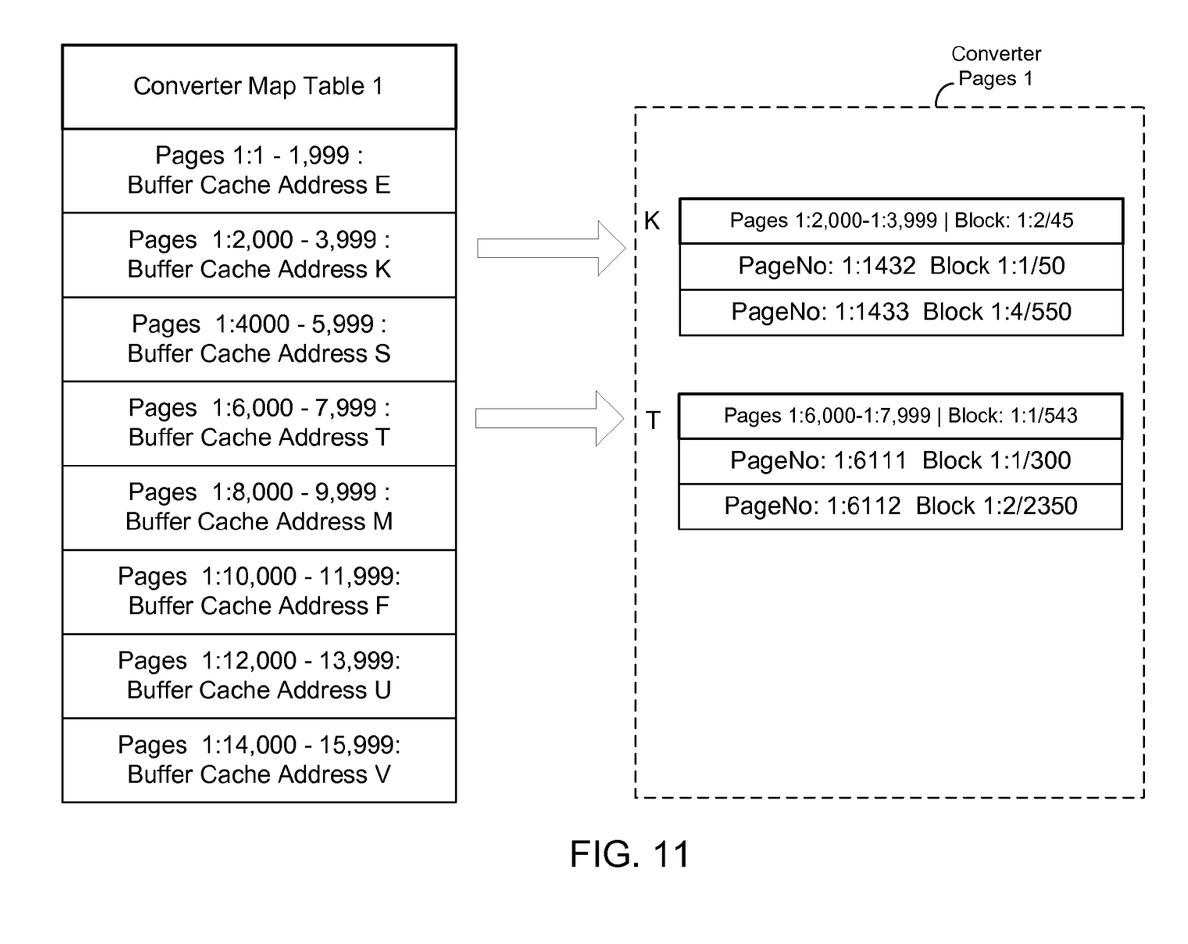
FIG. 11 illustrates components of a converter in a reader database cache according to some embodiments.

The converter page is associated with the second block address at S850. FIG. 10 illustrates changing block address 920 of converter page 900 in order to associate converter page 900 with the block address to which converter page 900 was written at S840. The changed converter page may reside in a new address of cache 113 after S850. Accordingly, converter map table 1 may be modified to point to the new address (e.g., address T) as shown in FIG. 11.

As a result of the foregoing, the modified database object will be stored in reader database 110 and may be accessed by standard mechanisms thereof, even though the file identifier and/or logical page number of the database object is associated with provider database 100. The modification also does not affect the original version of the database object stored in data volumes 1024 of provider database 100.

The embodiments described herein are solely for the purpose of illustration. Those in the art will recognize other embodiments may be practiced with modifications and alterations limited only by the claims.

What is claimed is:

1. A method comprising:
  modifying, by a computer, a database object of a reader database, wherein an identifier of the object is associated with a provider database; and
  mapping, by the computer, the identifier to a first block address of the reader database;
  wherein the mapping the identifier to the first block address comprises:
    providing a converter page to associate a block address of the provider database with a page number of the provider database; and
    modifying the converter page to associate the first block address of the reader database with the page number of the provider database.

2. A method according to claim 1, wherein the identifier is associated with a page number of the provider database.

3. A method according to claim 1, wherein mapping the identifier to the first block address further comprises:
  writing the converter page to a second block address of the reader database; and
  associating the converter page with the second block address.

4. A method according to claim 3, further comprising:
  writing the modified database object to the first block address of the reader database.

5. A method according to claim 1, further comprising:
  writing the modified database object to the first block address of the reader database.

6. A method according to claim 1, wherein the identifier comprises a unique identifier.

7. A method according to claim 1, wherein the identifier comprises a unique file identifier.

8. A computer-readable storage medium storing program code, the program code comprising:
  code to modify a database object of a reader database, wherein an identifier of the object is associated with a provider database; and
  code to map the identifier to a first block address of the reader database;
  wherein the code to map the identifier to the first block address comprises:
    code to provide a converter page to associate a block address of the provider database with a page number of the provider database;
    code to modify the converter page to associate the first block address of the reader database with the page number of the provider database.

9. A storage medium according to claim 8, wherein the identifier is associated with a page number of the provider database.

10. A storage medium according to claim 8, wherein the code to map the identifier to the first block address further comprises:
  code to write the converter page to a second block address of the reader database; and
  code to associate the converter page with the second block address.

11. A storage medium according to claim 10, the program code further comprising:
  code to write the modified database object to the first block address of the reader database.

12. A storage medium according to claim 7, the program code further comprising:
  code to write the modified database object to the first block address of the reader database.

13. A storage medium according to claim 8, wherein the identifier comprises a unique identifier.

14. A storage medium according to claim 8, wherein the identifier comprises a unique file identifier.

15. A system comprising:
  a provider database comprising:
    a provider data area comprising a plurality of provider data pages; and
  a reader database comprising:
    a reader data area comprising a plurality of reader data pages;
    a mapping of provider-specific identifiers to block addresses of the plurality of provider data pages and of reader-specific identifiers to block addresses of the plurality of reader data pages; and
  a database management system including a computer to:
    modify a database object of the reader database, wherein the object is associated with a provider-specific identifier; and
    modify the mapping to map the provider-specific identifier to a first block address of one of the plurality of reader data pages.

16. A system according to claim 15, wherein modification of the mapping comprises:
  modification of a converter page to associate the first block address with a provider-specific page number associated with the database object.

17. A system according to claim 16, wherein modification of the mapping further comprises:
  writing of the converter page to a second block address of a second one of the plurality of reader data pages; and
  association of the converter page with the second block address.

18. A system according to claim 17, the database management system further to:
  write the modified database object to the block address of the reader database.

19. A system according to claim 15, the database management system further to:
  write the modified database object to the block address of the reader database.

20. A system according to claim 15, wherein the identifier comprises a unique identifier.

21. A system according to claim 15, wherein the identifier comprises a unique file identifier.

* * * * *